Feb. 4, 1941.  F. J. SULLIVAN  2,230,472
BEARING
Filed April 29, 1939

INVENTOR
Frank J. Sullivan,
BY
Morsell, Lieber & Morsell
ATTORNEYS.

Patented Feb. 4, 1941

2,230,472

UNITED STATES PATENT OFFICE 2,230,472

BEARING

Frank J. Sullivan, Oshkosh, Wis.

Application April 29, 1939, Serial No. 270,780

5 Claims. (Cl. 308—26)

This invention relates to improvements in bearings.

Generally defined, an object of the present invention is to provide a readily adjustable, self-lubricating, resiliently supported bearing for a shaft.

A more specific object of the invention is to provide a bearing assemblage which, in addition to being self-lubricating, will function effectively to prevent the transmission of vibration from the shaft mounted therein to the bearing support.

Another specific object of the invention is to provide a new and useful bearing assemblage which can be readily manufactured at a relatively low cost with the aid of punches and dies.

Still another object of the invention is to provide a spherical bearing unit which is readily adjustable so as to insure proper alinement of the supported shaft.

A further object of the invention is to provide a compact and durable bearing unit having an inner lubricant confining chamber equipped with a vibration absorbing medium.

Another object of the invention is to provide a bearing assembly which is expeditious and commercially practical to manufacture, permitting the production of bearings easily, quickly, and at a minimum cost.

These and other specific objects and advantages of the present improvement will be apparent from the following detailed description.

A clear conception of the several steps involved in the production of the improved bearing structures and of the construction and operation of bearing units embodying the invention, may be had by referring to the drawing accompanying and forming a part of this specification wherein like reference characters designate the same or similar parts in the various views.

Figure 2:
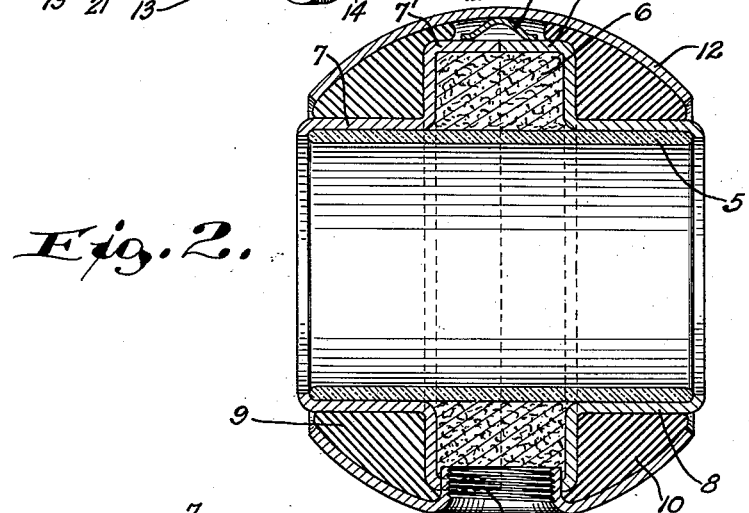
Fig. 2 is a similar sectional view showing the bearing fully assembled and with the outer shell thereof distorted into spherical shape.
Figure 3:
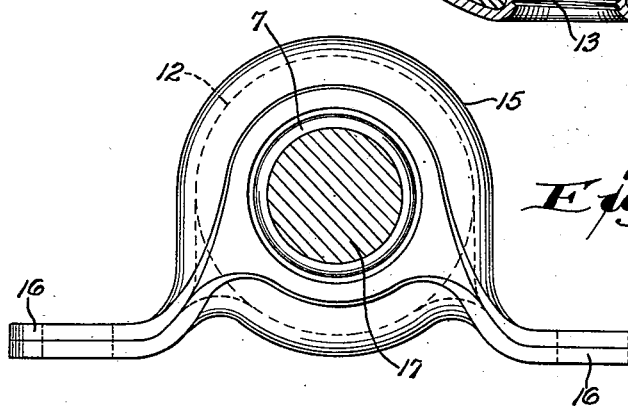
Fig. 3 is an end view, on a smaller scale, of the bearing with a shaft applied thereto and carrying a supporting strap.

Referring now more particularly to the drawing, it will appear that the finished bearing, shown in Figs. 2 and 3, includes a porous, central or axial bearing sleeve 5. Said sleeve is of cylindrical formation and is composed of any suitable porous material. Intermediate its ends the sleeve is surrounded by and carries a disc of packing and lubricant confining material 6, such as felt or the like.

A pair of similar, oppositely directed and complementary sheet metal sleeves 7 and 8 are carried by spaced portions of the sleeve 5, and the cupped or flared ends 7' and 8' of said sleeves engage each other and confine the felt disc 6. Resilient bushings 9 and 10, of substantially frusto-conical shape and of a rubber composition or the like, are carried by the respective sleeves 7 and 8. A spring element 11 is mounted on upper portions of the ends 7' and 8' of the sleeves and said spring also contacts an outer metallic casing 12, serving as an electrical connection to ground static electricity.

The outer casing 12 encloses the assemblage and the same is of spherical shape with open end portions through which the sleeves 7 and 8 project slightly. The bottom wall of the casing is formed with an internally threaded inturned neck 13 which is normally closed by a pipe plug 14 or by a suitable lubricant introducing fitting. The neck 13 communicates directly with the chamber in which the felt disc 6 is confined.

When in use, the improved bearing is confined within complementary sections of a housing 15. The housing sections carry oppositely directed arms or straps 16 for securement to a support, whereby the bearing may be suitably mounted. The bearing revolubly receives a shaft 17 which extends axially therethrough within the porous sleeve 5. It will be obvious that there is no metal to metal contact in the device and vibration and noise is effectively eliminated, especially adapting the bearing for use in connection with shafts used in air conditioning and heating equipment, where silence of operating members is required. In this particular it will be observed that the porous and fibrous material sleeve 5 is interposed between the metal shaft 17 and the metal cupped members 7 and 8. Also the resilient bushings 9 and 10 are interposed between the members 7 and 8 and the outer casing 12. Alinement of the shaft 17 is furthermore easily effected because the bearing members which enclose the shaft may be moved or flexed slightly against the resilient bushings 9 and 10. The revoluble shaft is maintained in a well lubricated condition by oil with which the felt disc 6 is saturated. This lubricant can seep through said porous member 5 and reach the surface of the shaft 17.

Figure 1:
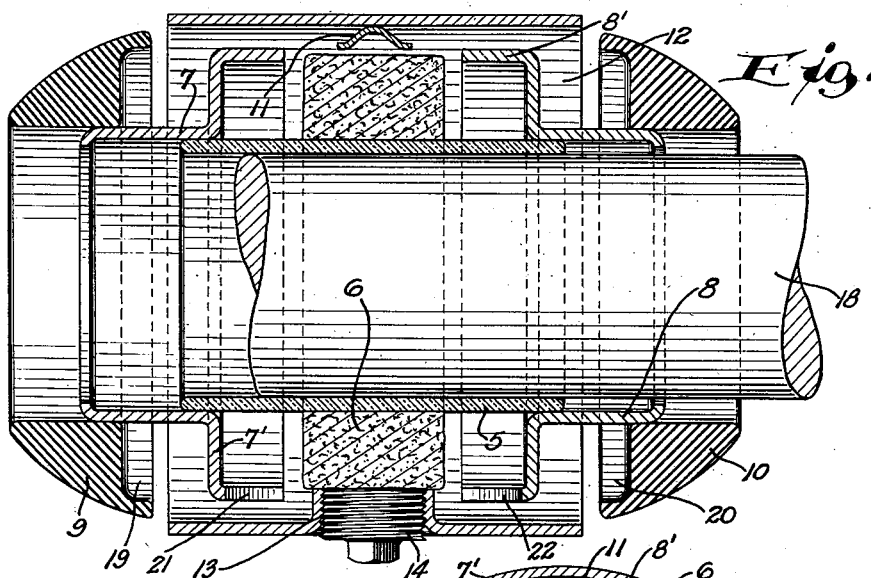
Fig. 1 is a longitudinal sectional view showing the improved bearing partially assembled.

The improved method of producing or assembling bearings of the form described heretofore, comprises the following steps: A porous bearing sleeve 5 is mounted on a mandrel 18 and the medial portion of the sleeve 5 has positioned thereon a lubricant confining disc 6. A spring element 11 is mounted on the upper portion of the felt disc 6 and immediately thereafter an outer cylindrical casing 12 is positioned so as to surround the assemblage thus far provided. Thereafter a pair of complementary metal sleeves 7 and 8 are slipped onto opposite end portions of the member 5 as in Fig. 1 and are initially allowed to remain in the position shown in said figure. A pair of resilient bushings 9 and 10 are next slipped onto the cylindrical ends of the metal sleeves 7 and 8 and are forced inwardly until the inner faces of the cupper portions 7' and 8' lodge in the inner face recesses 19 and 20 of said bushings 9 and 10. The outer casing must be positioned with respect to the felt before the metallic sleeve members 7 and 8 are inserted because the threaded internally projecting neck portion 13 of the casing 12 extends inwardly beyond the periphery of the cupped portions 7' and 8' of the members 7 and 8 and furthermore extends inwardly beyond the peripheries of the resilient bushings 9 and 10. Following the mounting of the casing 12, however, the metallic sleeves 7 and 8 are forced toward one another until their cupped ends meet to form a disk confining chamber as in Fig. 2. It will be observed that the lower ends of the cupped portions 7' and 8' are provided with complementary recesses 21 and 22 to surround and accommodate the inturned neck 13 on the lower portion of the outer casing. This arrangement is also effective in preventing undesired rotation of the complemental sleeves 7 and 8 when the shaft 17 is revolved. A plug 14 is next inserted into the internally threaded neck forming the casing opening 13, and the purpose of inserting the plug at this time is to prevent deformation of said neck when the next operation is proceeded with. In said next operation the assemblage is engaged by a suitable spherical forming die and plunger which presses the outer casing into the spherical form shown in Fig. 2 to thereby snugly confine all of the internal elements. Subsequently the bearing assemblage may be confined within the complementary sections of the housing 15 for suitable mounting in an installation.

It should be understood that it is not desired to limit this invention to the precise details of construction herein shown and described, for various modifications within the scope of the claims may occur to persons skilled in the art.

What is claimed as the invention is:

1. In a bearing for revolving shafts, an outer metallic casing, a porous sleeve mounted axially of the casing, a lubricant holding pad mounted on a portion of the sleeve, complementary cup forming members carried by other portions of the sleeve and confining said pad, lubricant introducing means extending through a portion of the casing and the cup forming members to the lubricant holding pad, and resilient members mounted on portions of the cup forming members axially of the pad to seal the same and engaging inner wall portions of the casing.

2. In a bearing for revolving shafts, an outer metallic casing having an inturned lubricant introducing neck, a sleeve mounted axially of the casing, said sleeve having a portion through which lubricant may seep, a lubricant holding pad mounted on said portion of the sleeve and adjacent an inner end of said neck, complementary cup forming members carried by other portions of the sleeve and jointly confining said pad, adjacent portions of said cup forming members having complementary recesses surrounding said neck whereby said cup forming members embrace the neck to prevent undesired rotation of the cup forming members, and resilient members confined within the casing between inner wall portions thereof and the cup forming members.

3. In a bearing for revolving shafts, an outer casing having wall portions of spherical contour, an inner axial sleeve, a portion of which is lubricant permeable, a reservoir member mounted on said sleeve, said reservoir member having an intermediate relatively large diameter portion terminating inwardly of the spherical contour wall portions of the casing and forming a secondary space and relatively small diameter hubs on opposite sides of said large diameter portion, a lubricant holding member surrounding the lubricant permeable portion of the sleeve and confined within the large diameter portion of the reservoir member from which lubricant may seep into said secondary space, and resilient members on the hubs of said reservoir member seating against the large diameter portion thereof and engaging inner wall portions of the casing to seal the ends of the large diameter portion of the reservoir member and the secondary space.

4. In a bearing for revolving shafts, an outer casing, an inner axial sleeve having a portion through which lubricant may seep, there being within the casing a main lubricant chamber surrounding said portion of the sleeve and other lubricant receiving spaces into which lubricant may enter from the main chamber, and resilient members mounted on other portions of the sleeve axially of and adjacent to the ends of said main chamber and spaces and engaging inner wall portions of the casing to completely seal the ends of said main chamber and spaces and to prevent vibration.

5. In a bearing for revolving shafts, an outer casing having wall portions of spherical contour, a supporting housing including complementary straps having portions of curved contour adjustably engaging the spherical contour portions of the casing, an inner axial sleeve having a portion through which lubricant may seep, there being a lubricant chamber within the casing and surrounding said portion of the sleeve, and resilient members mounted on other portions of the sleeve axially of and adjacent to both ends of the lubricant chamber and engaging inner wall portions of the casing to completely seal the ends of the lubricant chamber and to prevent vibration.

FRANK J. SULLIVAN.